United States Patent [19]

Kinnander et al.

[11] 4,298,433

[45] Nov. 3, 1981

[54] MEANS FOR SUPPLYING FEED WATER TO A SUBSTANTIALLY CYLINDRICAL, VERTICAL REACTOR TANK

[75] Inventors: Bo Kinnander; Torstein Landa; Ragnar Mansson, all of Vesteras, Sweden

[73] Assignee: AB Asea Atom, Sweden

[21] Appl. No.: 22,547

[22] Filed: Mar. 21, 1979

[30] Foreign Application Priority Data

Mar. 21, 1978 [SE] Sweden .............................. 7803213

[51] Int. Cl.³ ............................................ G21C 15/00
[52] U.S. Cl. .................................. 376/286; 137/590; 376/204; 376/399
[58] Field of Search ....................... 176/61, 50, 54–56, 176/85, 87, 65; 137/590

[56] References Cited

U.S. PATENT DOCUMENTS

| | | | |
|---|---|---|---|
| 2,983,659 | 5/1961 | Treshow | 176/55 |
| 3,085,960 | 4/1963 | Correc | 176/85 |
| 3,378,456 | 4/1968 | Roberts | 176/61 |
| 3,380,649 | 4/1968 | Roberts | 176/61 |

FOREIGN PATENT DOCUMENTS

| | | | |
|---|---|---|---|
| 854144 | 11/1960 | United Kingdom | 176/85 |
| 855358 | 11/1960 | United Kingdom | 176/85 |

*Primary Examiner*—Harvey E. Behrend
*Attorney, Agent, or Firm*—Pollock, Vande Sande & Priddy

[57] ABSTRACT

A nuclear reactor assembly including a substantially cylindrically-shaped and vertically extending pressure vessel. A uniquely constructed bracket assembly is arranged for mounting a water distributor against an inner wall of the cylindrically-shaped pressure vessel, with the bracket assembly including a spring assembly capable of biasing an inlet conduit of the water distributor into abutting contact with an inlet nozzle extending through a wall of the pressure vessel.

9 Claims, 6 Drawing Figures

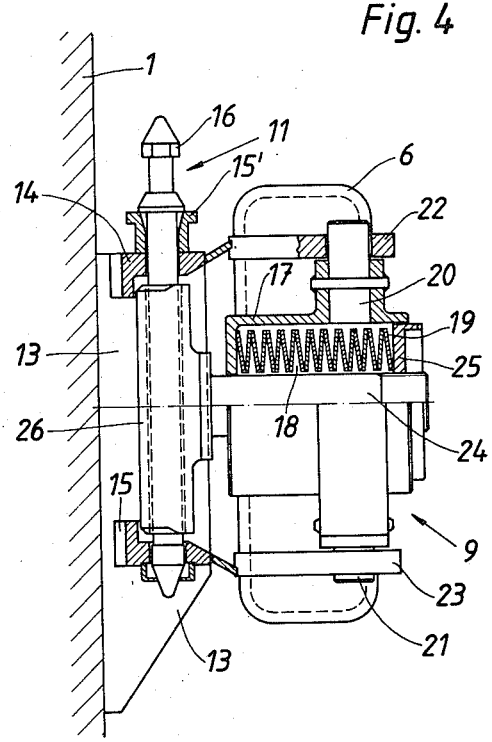
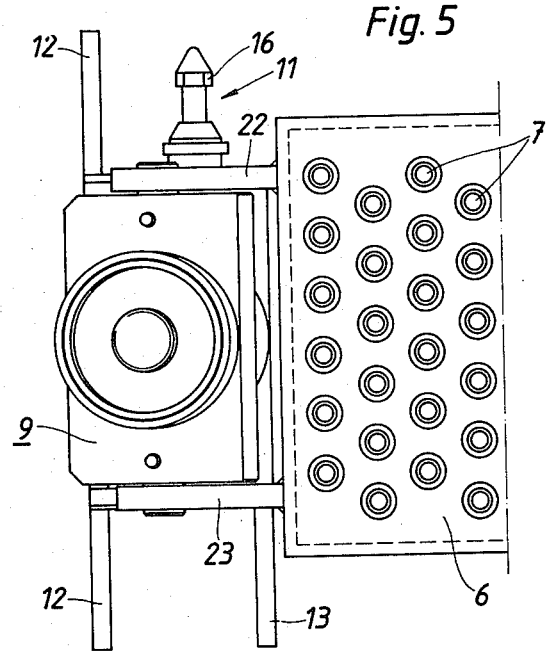

MEANS FOR SUPPLYING FEED WATER TO A SUBSTANTIALLY CYLINDRICAL, VERTICAL REACTOR TANK

The present invention relates to a means in accordance with the preamble of claim 1.

In such a means the water flowing into the water distributor causes it to be subjected to a force operating radially inwardly. It is therefore necessary to mount the distributor in such a manner that the force which presses the contact surface of the insertion pipe against the radially inwardly facing contact surface in the feed-water nozzle is greater than the maximum value of the force deriving from the feed water flowing in while at the same time avoiding too great a clamping force which would entail unnecessarily great strain on the feed-water distributor.

Theoretically it would be possible to achieve this by connecting the ends of the feed-water distributor to the wall of the reactor tank with the assistance of members for transmitting tensile force of adjustable length and then, while measuring the tensile force, adjust the length in such a way that the desired clamping force is obtained. However, due to radioactivity, such a procedure would be extremely difficult to perform if the original feed-water distributor should have to be replaced at any time.

In a known arrangement described in the preamble of claim 1 the members for transmitting tensile force are constructed so that each end of the distributor has a fixed distance to the wall of the tank, which corresponds to the elastic deformation of the feed-water distributor at which the desired contact pressure against the contact surface of the feed-water nozzle is obtained.

However, the degree to which the deviation between calculated and actual stress on the feed-water distributor can be kept within sufficiently narrow limits is dependent upon the precision with which the feed-water distributor can be manufactured. It has been found that sufficient ensurance against mechanical overloading of the feed-water distributor can only be achieved with manufacturing tolerances which are relatively small in comparison with those used normally for similar type of manufacture.

The drawback mentioned above is avoided with a means according to the invention.

The characteristic features of the invention are revealed in the accompanying claims.

The invention will be described in the following with reference to the accompanying schematical drawings in which FIG. 1 shows a means according to the invention seen from above. The means is symmetrical about a vertical central plane.

FIGS. 3 and 4 show sections along III—III and IV—IV, respectively, in FIG. 2, and FIG. 5 shows a view along V—V in FIG. 2.

Figure 1:
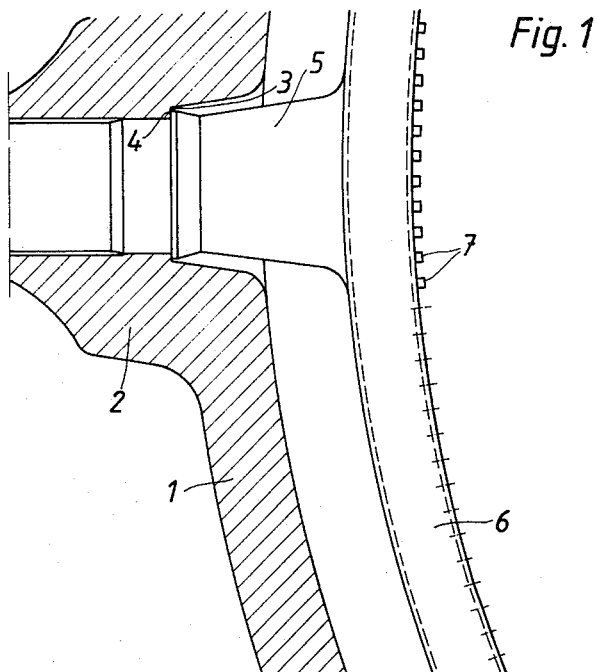

In the drawings 1 designates a reactor tank and 2 a feed-water nozzle in the tank wall which is provided with an annular, inner contact surface 3 in contact with a corresponding contact surface 4 on an insertion pipe 5 which is surrounded by the feed-water nozzle 2. The insertion pipe 5 is mechanically and hydraulically connected to an elongate feed-water distributor 6 in the form of a hollow ring sector, slightly less than 120°, which is provided with a plurality of nozzles 7 directed radially inwardly and forming outlet openings. The water flowing into the feed-water distributor exerts a force directed radially inwards thereon. This force is counteracted by the feed-water distributor being connected mechanically at each end to a bracket arrangement 8 welded to the wall of the reactor tank, by means of a spring member 9 transmitting tensile force and a vertical shaft 11 journalled in the bracket means 8. The bracket arrangement 8 includes two ears 12 and 13 welded to the reactor tank, and a horizontal upper guide plate 14 and a horizontal lower guide plate 15 welded to the ears. The guide plates 14 and 15 are provided with through-holes in which the shaft 11 is journalled, resting on a bushing 15' secured to the guide plate 14. The shaft 11 is provided with a gripping head for a tool operated by remote control and can easily be assembled and dismantled by applying a vertical force in combination with a turning movement.

The spring member 9 includes a spring housing 17 with a circular-cylindrical spring space 18 in which a plurality of cup springs 19 are arranged side by side on horizontal direction. The spring housing 17 is provided with two cylindrical shaft pins 20 and 21 secured thereto, arranged in line with each other and pivotably journalled in two ears 22 and 23 welded to one end of the feed-water distributor 6. The cup springs 19 surround a horizontal, cylindrical body 24 which is inserted into the spring housing and which is provided at one end with a nut 25 with the help of which the cup springs can be compressed to a greater or lesser degree. The cylindrical body 24 is at the other end rigidly joined to an oblong sleeve 26 surrounding the shaft 11 and being pivotably in relation thereto.

Figure 6:
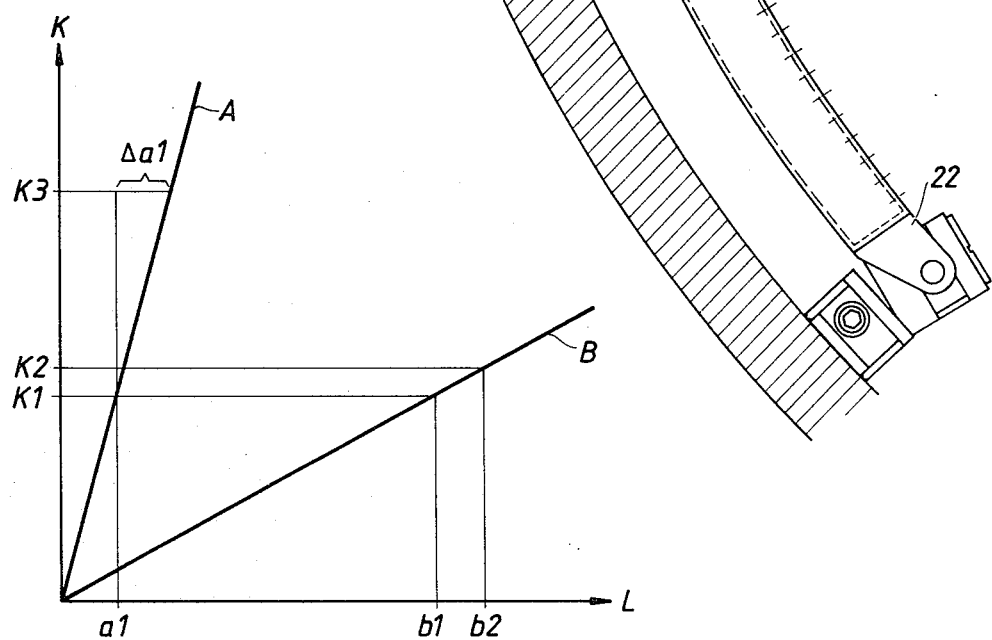
FIG. 6 shows curves for elastic deformation of the feed-water distributor and of a spring member for transmitting tensile force.
Figure 2:
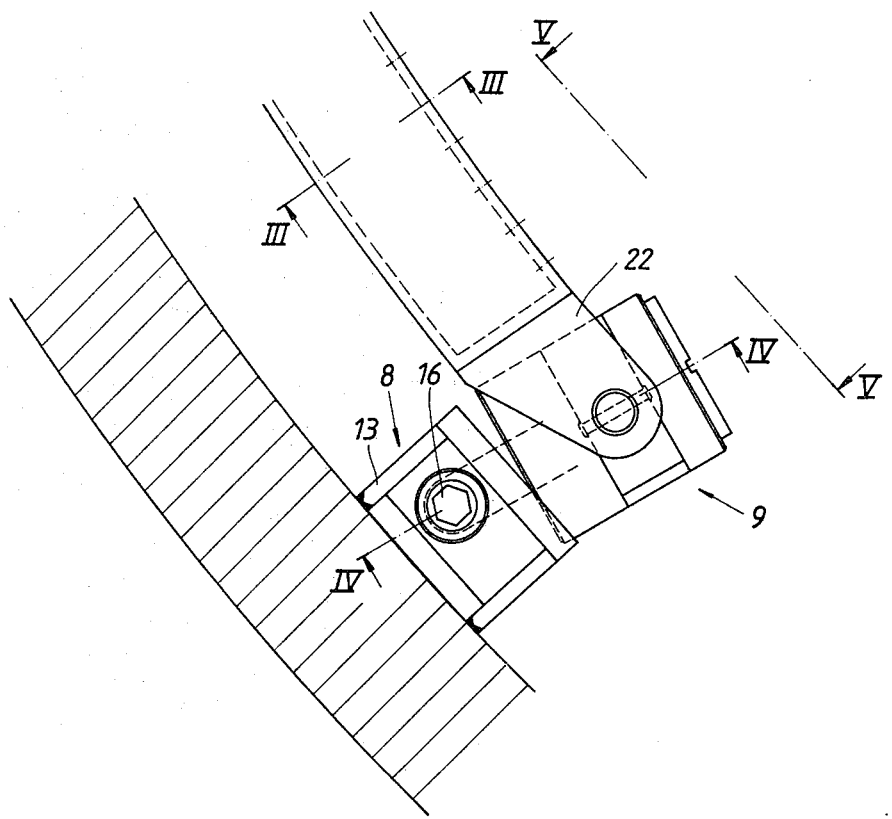
FIG. 2 shows a detail from FIG. 1.
Figure 3:
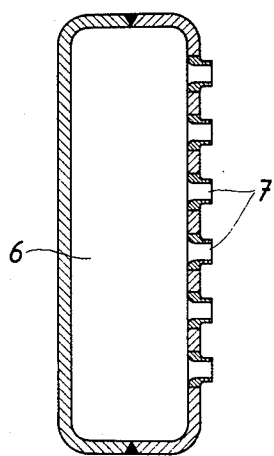

FIG. 6 shows a curve A relevant for a feed-water distributor according to the invention, indicating the necessary bending out force at the end as a function of the bending out distance from stressless state, whereas curve B applies to a spring member according to the invention and shows the spring force, K, as a function of the stress, L. K1 is the desired radial clamping force at the end of the feed-water distributor. When the means is first fitted the spring is adjusted in such a way that this tensile force is obtained, whereby the elastic deformation of the distributor is a1 and of the spring b1. Let us imagine that the distributor is replaced by a new one having the same spring constant as the old one but which, due to unavoidable tolerances during manufacture, has a slightly different shape so that the distance of the end of the distributor from the tank wall, measured in stressless state, is increased by Δa1. If instead of a spring member, a rigid connection of the same length as the length of the spring member when originally assembled is used, a radial force K3 would act at the end of the distributor. However, the use of a spring member means that the tolerance error Δa1 is mostly taken up by the spring which acquires a deformation b2 and the radial force acting at the end of the new feed-water distributor will be K2 instead of K3. Thus, in the example shown, a doubling of the mechanical stress in the feed-water distributor has been avoided through the use of a spring clamping means, and instead only a slight increase has taken place.

With a means according to the invention curve A has preferably at least twice the pitch of curve B.

How far it is possible to go in this respect is determined, inter alia, by the limited space available for the spring means. The arrangement shown in the drawings is extremely advantageous from the point of view of space.

I claim:

1. In a nuclear reactor having a substantially cylindrically-shaped and vertically extending pressure vessel and a feed-water distribution assembly for conveying and distributing feed-water within said pressure vessel, said pressure vessel having a vertically extending, substantially cylindrically-shaped wall having a feed-water nozzle extending therethrough, said feed-water nozzle having a cylindrical inner surface portion of a first diameter with an annular inner contact surface thereon of a second diameter greater than said first diameter, said feed-water distribution assembly a hollow flow passageway assembly positioned within said pressure vessel and projecting into said feed-water nozzle extending through said cylindrically-shaped wall, said hollow flow passageway assembly including an outlet and an inlet, said flow passageway assembly inlet comprising a radially outwardly extending annular abutment portion having a diameter greater than the diameter of said inner surface portion of said feed-water nozzle, said inner surface portion being located upstream from said flow passageway assembly, whereby contact between said abutment portion and said contact surface provides a stop to limit insertion of said flow passageway assembly into said feed-water nozzle;

a curved, non-annular flow distributor assembly positioned within said pressure vessel and having an inlet attached to and in joint fluid-tight communication with said outlet of said flow passageway assembly, said flow distributor assembly further including a hollow passageway having a radially inner wall facing away from said flow passageway assembly and formed with a plurality of through apertures;

first and second bracket assemblies each fixedly attached to an inner surface of said cylindrically-shaped wall and circumferentially spaced from one another such that said first bracket assembly is positioned adjacent a first end portion of said curved flow distributor and said second bracket assembly is positioned adjacent a second end portion of said curved flow distributor;

each of said first and second bracket assemblies including a separate force transmitting member pivotally attached at one end portion to a respective bracket assembly with a resistance member adjustably mounted on an opposite end portion of said force transmitting member;

a separate attachment member surrounding each force transmitting member and each attachment member being pivotally attached to one of said first and second end portions of said flow distributor; and separate spring means compressed between each attachment member and an adjacently disposed resistance member for automatically biasing said curved flow distributor towards said cylindrically-shaped wall, said resistance member having adjusting means associated therewith for initially compressing said spring means a predetermined amount with said predetermined amount being such that said attached flow passageway assembly projects into said feed-water nozzle and said abutment portion of said flow passageway assembly contacts said inner contact surface with a substantially constant pressure regardless of changes in fluid pressure generated by feed-water flowing through said feed-water distribution assembly.

2. In a nuclear reactor according to claim 1, wherein said inner contact surface of said feed-water nozzle forms a substantially perpendicular angle with an adjacent surface portion positioned downstream from said inner contact surface; and said abutment portion includes a planar surface extending substantially parallel to said adjacent surface to provide surface contact between said abutment portion and said inner contact surface upon insertion of said flow passageway assembly a predetermined distance into said feed-water nozzle.

3. In a nuclear reactor according to claim 1, wherein said flow distributor comprises a hollow passageway having an angle of curvature substantially similar to an angle of curvature of said cylindrically-shaped wall, with said hollow passageway extending through an arc slightly less than 120°.

4. In a nuclear reactor according to claim 1, wherein each force transmitting member comprises an elongated rod pivotally attached to its respective bracket assembly and having a longitudinal axis extending in a radially inwardly direction from its respective bracket assembly.

5. In a nuclear reactor according to claim 1, wherein each attachment member comprises a substantially cup-shaped member surrounding a force transmitting member with a bottom wall portion of each cup-shaped member remotely positioned from said respective resistance member;

each attachment member further includes a pin member extending transversely through said cup-shaped member and pivotally attached to one of said first and second end portions of said flow distributor assembly.

6. In a nuclear reactor according to claim 5, wherein said separate spring means comprises a plurality of separate springs each compressed between the bottom wall of said cup-shaped member and a resistance member for transmitting tensile forces between said flow distributor assembly and said bracket assembly.

7. In a nuclear reactor according to claim 1, wherein each resistance member comprises a nut having a threaded bore engaging corresponding threads formed on one of said force transmitting members for adjustably positioning each nut along its force transmitting member.

8. In a nuclear reactor according to claim 1, wherein each of said first and second bracket assemblies comprises a pair of spaced ear members each fixedly attached to an inner surface of said cylindrically-shaped wall, each bracket assembly further includes a pair of upper and lower guide plates extending between and fixedly attached to said spaced ears with aligned through apertures extending through each pair of guide plates;

each bracket assembly further includes a pivot shaft extending through a pair of aligned through apertures and attached to one of said force transmitting members, thereby providing pivotal movement of each force transmitting member relative to its respective pair of spaced ear members.

9. In a nuclear reactor according to claim 8, wherein each pair of spaced ears and each pivot shaft extends in a vertical direction parallel to a longitudinal axis through said cylindrical-shaped wall.

* * * * *